(12) United States Patent
Farrugia et al.

(10) Patent No.: US 8,086,854 B2
(45) Date of Patent: Dec. 27, 2011

(54) CONTENT PROTECTION INFORMATION USING FAMILY OF QUADRATIC MULTIVARIATE POLYNOMIAL MAPS

(75) Inventors: Augustin J. Farrugia, Cupertino, CA (US); Gianpaolo Fasoli, Palo Alto, CA (US); Mathieu Ciet, Paris (FR); Nicholas Sullivan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 939 days.

(21) Appl. No.: 12/060,763

(22) Filed: Apr. 1, 2008

(65) Prior Publication Data
US 2009/0249068 A1 Oct. 1, 2009

(51) Int. Cl.
| H04L 9/32 | (2006.01) |
| H04L 9/00 | (2006.01) |
| H04L 9/30 | (2006.01) |
| H04L 9/28 | (2006.01) |
| G06F 11/30 | (2006.01) |
| G06F 17/50 | (2006.01) |
| G09C 1/00 | (2006.01) |
| H04L 12/24 | (2006.01) |
| H04L 12/26 | (2006.01) |
| H04L 27/28 | (2006.01) |
| H04K 1/00 | (2006.01) |

(52) U.S. Cl. ........ 713/168; 713/180; 713/193; 716/104; 380/28; 380/30; 380/263

(58) Field of Classification Search ............. 713/168, 713/180, 193; 380/263; 716/104
See application file for complete search history.

(56) References Cited

U.S. PATENT DOCUMENTS
2004/0133794 A1 * 7/2004 Kocher et al. ............ 713/193
2008/0013716 A1 * 1/2008 Ding ........................ 380/30

FOREIGN PATENT DOCUMENTS
JP  2011107528 A * 6/2011

OTHER PUBLICATIONS

Delgosha, F.; Fekri, F.; "A multivariate key-establishment scheme for wireless sensor networks"; Wireless Communications, IEEE Transactions on vol. 8, Issue: 4; Digital Object Identifier: 10.1109/TWC.2009.071338; Publication Year: Apr. 2009; pp. 1814-1824.*

* cited by examiner

Primary Examiner — Matthew Smithers
Assistant Examiner — Courtney Fields
(74) Attorney, Agent, or Firm — Morrison & Foerster LLP

(57) ABSTRACT

A computer based method and apparatus to tie content protection information to recipient devices via a family of deterministic permutations of quadratic multivariate polynomial maps used for computing an HMAC (Hash Message Authentication Code) or a signed digest. This allows digital rights management (DRM) systems to customize the protection information (such as an HMAC or signed digest) for audio and video content, whereby such protection information for a piece of content differs for different recipient devices or for types of recipient devices.

22 Claims, 1 Drawing Sheet

US 8,086,854 B2

CONTENT PROTECTION INFORMATION USING FAMILY OF QUADRATIC MULTIVARIATE POLYNOMIAL MAPS

FIELD OF THE INVENTION

The present disclosure relates to storage methods for audio and video digital content, devices for using such methods, and systems for distributing such stored content.

BACKGROUND

Protection of digital content (such as audio and video) transferred between computers or computing devices over a network (such as the Internet) is fundamentally important for many enterprises today. Enterprises attempt to secure this protection by implementing some form of Digital Rights Management (DRM) process. The DRM process often involves encrypting the piece of content (e.g., encrypting the binary form of the content) thereby to restrict usage to those who have been granted a right to the content. Typically the encryption is provided at a central server and the content distributed to client devices.

Some of the rights to pieces of content that are distributed by existing DRM systems are permitted to be viewed on a certain number of distinct devices (i.e. platforms such as computers, computing devices, players, cell phones) simultaneously. For instance, one existing DRM system distributes certain recorded songs to both desktop computer systems and portable player devices using the same method. The method used does not take advantage of the increased performance of the desktop system to increase DRM protection. If the DRM encryption is broken for one of the two platforms, it can be used to break the DRM encryption on the other platform and on other instances of the same platform. Existing DRM systems thereby typically widely distribute content protected by only one digital rights protection mechanism. However, content providers would like to have their content viewed on different platforms and would like to maintain the integrity of the security measures while taking advantage of the differences in resources on the various recipient platforms.

However, the present inventors have recognized that existing DRM systems often do not allow the mechanism for decryption of protected content to vary based on the specific recipient device and device type. Allowing the authentication or verification (such as an HMAC or digest) to vary across devices and device types prevents a party that breaks the DRM security on one device or device type to break the DRM security on another device or device type. Furthermore, allowing different mechanisms for authentication to be used for different device types can allow the distributing party to choose use a mechanism more suited to the target device. Therefore the present inventors have identified a need for a DRM system that flexibly allows content distributors to set content protection mechanisms based on both the device and the device type.

SUMMARY

Accordingly, the present inventors have identified a need for a content distribution mechanism that can flexibly change the method of content protection according to both the specific device and the device type that the content is intended to be accessed by. This is accomplished by allowing the authentication or verification mechanism in the DRM system to vary across devices and device types. (These mechanisms are generically referred to here as "authentication.") This method employs a parameterized family of transformations used to non-linearly transform a set of data in a flexible and customizable way. The basic parameters represent the size of a basic block of data, the number of blocks of data in the input and the number of blocks of data in the output. Each instance of the transformation, that is each member of the family, takes an input of the number of input blocks of the predetermined length and outputs the number of output blocks, of the same predetermined length, that have been transformed. The transformations are in one embodiment a set of multivariate polynomials of degree 2. The number of polynomial coefficients are in the range of 0 to $2^{S-1}$, where S is the number of bits per block.

DETAILED DESCRIPTION

Figure 1:
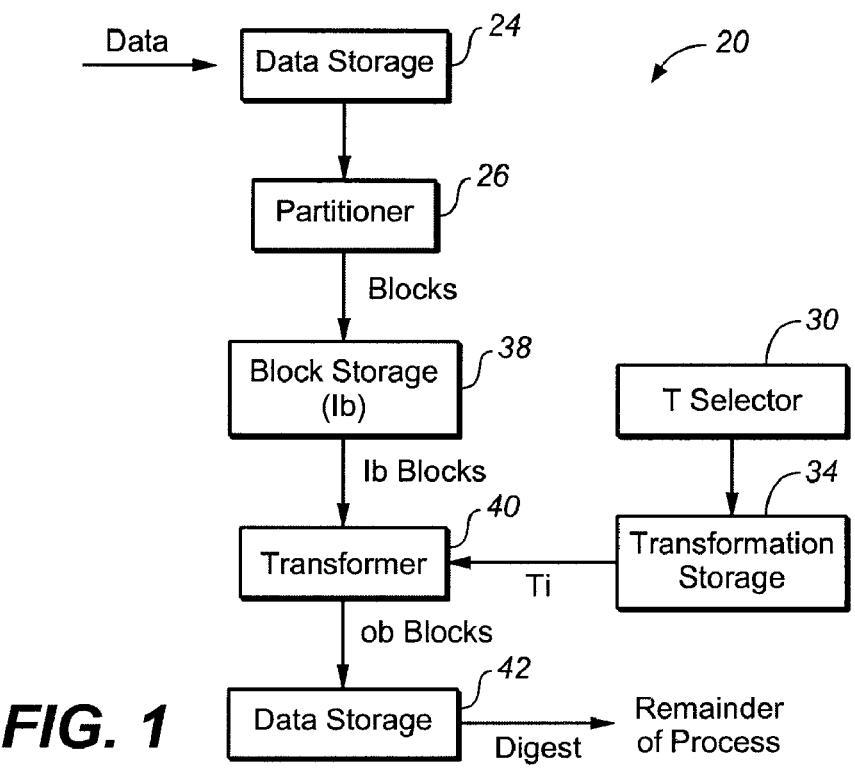
FIG. 1 is a block diagram of an apparatus for use in an exemplary protection process.

Exemplary embodiments of the invention are disclosed here in the context of cryptographic HMAC or digests. An HMAC (Hash Message Authentication Code) is conventionally calculated using a specific algorithm involving a cryptographic hash function with a secret key, from a message. It is used to verify the integrity and/or source of the message. Conventional functions such as MD5 or SHA-1 are used to calculate an HMAC. A digest is the result (output) of a one-way function, and is also referred to as a "message digest," and is useful for message verification. The receiving device computes its own HMAC or digest from the received message, and matches that to the HMAC or digest value that accompanies the message.

The present system in one embodiment uses a parameterized family of transformations that non-linearly transform a set of data in a very flexible and customizable way for authentication. The basic set of parameters is designated here (S, lb, Ob) with 'S' representing the size of a basic block of data, 'lb' representing the number of blocks of data in the input to the transformation and 'Ob' representing the number of blocks of data in the transformation output. Each instance of the transformation thereby takes an input of lb blocks each of S bits and will output Ob blocks each of S bits that have been transformed.

Each of these transformations T is expressed here in one embodiment as a set of Ob multivariate polynomials in lb variables with coefficients from 0 to ($2^{S-1}$) and with degree two. This can be expressed as:

$$T=(T_1, T_2, \ldots, T_{ob})$$

Each $T_i$ is a multivariate polynomial in lb variables of degree two and coefficients in the range 0 to ($2^{S-1}$). When supplied with an input (data) X expressed as (x1, x2, ..., xlb), the transformation T is applied as:

$$T(X)=(T_1(x1, x2, \ldots, xlb), \ldots, T_{ob}(x1, x2, \ldots, xl)).$$

If $T_i$ is the polynomial written as: $T_i = a_{(1,1)}*x1*x1 + \ldots + a_{(i,j)}*xi*xj + \ldots + a_{(lb,lb)}*xlb*xlb$, where $a_{(i,j)}$ represents the polynomial coefficients then $T_i$ is evaluated by applying an agreed upon (predetermined) notion of commutative addition and commutative multiplication to the set $\{0, \ldots, 2^{S-1}\}$. For example, if S=8, the coefficient octets could be used to represent elements of the Galois field GF ($2^8$), and addition and multiplication could be applied as defined in that field.

In another embodiment, one uses custom operations with non-traditional arithmetic such as a, b being elements of the set $\{1, 2^{16}\}$ and define a*b=a*b modulus $(2^{16}+1)$, and a+b=a+b modulus $(2^{16}+1)$ if a+b≠$2^{16}$+1; otherwise a+b=a.

As an example of the parameters let (S, Ib, Ob)=(8, 8, 8). A transformation T with such parameters would be described by 8 polynomials in 8 variables, each with 64 degree two coefficients represented by octets. These polynomials could be stored as an array of 8*8*64 octets and the associated arithmetic could be any addition and multiplication on 8 bits. Each transformation $T_i$ would take 64 bits as input and provide 64 bits as output.

Many such transformations could be applied in sequence as long as parameter Ob of the first transformation equals the parameter Ib for the next transform in the chain. One such transformation or a chain of such single transformations is used as one step in an HMAC used in a DRM mechanism. As noted above, HMAC functions inherently each have a key (since they are cryptographic.) The keys are predetermined and hard-coded in the DRM software. The key here is used to determine the polynomial coefficients. For example, the coefficients may be identical for each member of a type of devices, but are used differently, such as in a different order, for each individual device. The way they are used here is thereby determined by the HMAC key.

An advantage of this family of transformations is that they are very flexible and customizable. One feature of this family of transformations is that the arithmetic operations on a basic data block can be different for two different devices (platform). For instance, each individual device may have its own HMAC key derived, e.g., from the device. Furthermore, the mapping between the coefficients of the polynomials and the array of basic blocks representing them can be dependent on the particular user device (platform) implementing the DRM. This allows the table of polynomial coefficients to be fixed but the polynomials they represent may vary based on the platform that the associated content is to be accessed on, thereby providing a different key for performing the DRM digest operation on each recipient (user) device using a constant block of data. For instance, the polynomial may be arranged in a distinct order determined by a property of the device such as its serial number. In an example, if the device serial number is 22, the first byte would represent the 22nd coefficient, etc.

In another embodiment, different families of recipient (user) devices may use transformations having different parameters S, Ib, ob. For device types that are more limited in computing power or memory (such as Smart cards or embedded consumer electronic devices), smaller values for Ib and Ob may be used, requiring smaller tables of data. For device types with more computing power such as desktop computers the transformations can be chained, and larger values of S, Ib and Ob may be used, providing increased complexity and security. this flexibility allows "chaining" of the polynomials, expressed logically as: $Ib_1 \rightarrow Ob_1 \Rightarrow Ib_2 \rightarrow Ob_2$.

The flexibility allowed for choosing the parameters S, Ib, Ob, and the arithmetic operations differently for different recipient devices provides beneficial properties that can be employed to provide different level DRM mechanisms per individual device and per device type.

FIG. 1 shows in block diagram form an apparatus 20 for accomplishing the transformation which is part of the DRM process, for instance part of an authentication process. This is typically carried out in the context of a DRM server operated by the content provider, or perhaps under his control, or perhaps under control of an on-line "store" (vendor) of on-line content, such as video and audio material. While this apparatus is shown in a block diagram, it may be accomplished in the form of a computer program (computer code) executed on a server, which is effectively then a programmed computer. Associated with this apparatus therefore is a computer readable medium which would store the relevant computer code. The same is true of the FIG. 2 apparatus 50.

In FIG. 1, apparatus 20 is part of an otherwise conventional DRM authentication process. The incoming data (e.g., a piece of content) which may already have been partly processed or may still be in original form is submitted as data in the upper left hand portion to a data storage element such as a register in memory 24. This is then coupled to a partitioner 26 which partitions the data into blocks of length S. The blocks are then transmitted to an input block storage 38 which outputs the input blocks Ib to a transformer element 40. Element 40 carries out the transformations as explained above.

Transformer element 40 is driven by a transformation selector 30 which has the ability (determined by the system designer) to select at any one time which particular transformation of the defined family is to be used. For instance, the choice may be based on the current state of the host device (server.) Selector 30 is coupled to a transformation storage element 34 which stores the various transformations $T_i$ in the family T, or at least the parameters to define each $T_i$. The selected transformation $T_i$ (or its parameters) is supplied to the transformer 40 which performs the actual transformation calculation and outputs the output blocks ob to an output data storage element 42. Element 42 is in communication with the remainder of the authentication process, and ultimately the digest or HMAC associated with the content is transmitted to the user devices, for instance over the Internet.

Figure 2:
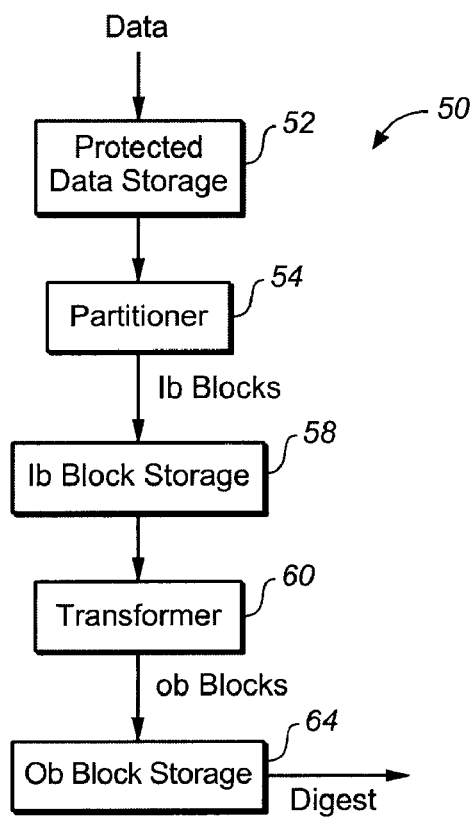
FIG. 2 is a block diagram of an apparatus for use in an exemplary user device process.

FIG. 2 shows the complementary apparatus 50 at the user (recipient) device. Again only the relevant portions are shown and typically this would be part of a DRM system at the user device, in this case in the context of authentication. The content data transmitted from the host server of the apparatus of FIG. 1 is received by recipient apparatus 50 in the upper portion of FIG. 2 and is stored in the protected data storage (e.g., register) 52. Next is partitioner element 54 which partitions the received content data into blocks each of length S, outputting Ib blocks. These blocks are then stored in the Ib block storage (e.g., register) 58. These are then supplied one block at a time to the transformer element 60 which has been previously set to carry out the transformation of FIG. 1. Each transformation function is the same as the original, and used for determining a symmetric key. Transformer element 60 then outputs the retransformed (restored) ob blocks to an ob block storage (register) 64 and hence they are communicated to the remainder of the DRM process to be used conventionally for authentication of the content.

In addition to a method, the present disclosure contemplates the above disclosed associated apparatus, at both the transmitting and receiving devices (platforms). The method may be embodied in a computer program, and the associated apparatus may include a programmed computer or computing device, as well as a computer readable medium storing the code of the computer program. The computer program may be coded in any convenient computer language such as C++.

This disclosure is illustrative and not limiting; further modifications and improvements will be apparent to those skilled in the art in light of this disclosure and are intended to fall within the scope of the appended claims.

We claim:

1. A method to protect digital content, comprising the acts of:

storing the digital content in a first data storage;

providing a family of non-linear multivariate polynomials to be used for authentication of the content, the family characterized by a set of parameters;

selecting one instance of the family based on a current state;

applying to the digital content the selected instance of the family to determine an authentication value which is stored in a second data storage, wherein a number of data blocks in the authentication value is equal to a number of instances in the family of polynomials; and distributing the digital content over a computer network to at least one target device together with the authentication value.

2. The method of claim 1, wherein the authentication value is a part of a digital rights management (DRM) system.

3. The method of claim 1, wherein the authentication value is an HMAC or digest.

4. The method of claim 1, wherein the content is an audio or video item.

5. The method of claim 1, further comprising the act of:
partitioning the content into portions, each portion representing a predetermined number of blocks of predetermined length.

6. The method of claim 5, wherein the authentication value has a different number of data blocks than does the portion of the content.

7. The method of claim 1, wherein the polynomials are second degree.

8. The method of claim 5, wherein a number of coefficients of the transforming is $2^{S-1}$, S being a number of bits in each block.

9. The method of claim 5, wherein the selected instance is evaluated by applying a commutative addition and commutative multiplication to a set having $2^{S-1}+1$ elements, S being the number of bits per block.

10. The method of claim 9, the set being $\{1, \ldots, 2^{16}\}$.

11. The method of claim 1, further comprising the act of applying a plurality of instances of the family to each block sequentially.

12. The method of claim 3, wherein the authentication value is computed by a symmetric or asymmetric algorithm.

13. The method of claim 1, further comprising the acts of:
applying to the digital content a second instance of the family; and
distributing an authentication value calculated by the second instance to a second target device.

14. The method of claim 13, wherein the second device is of a different type than the first target device.

15. The method of claim 14, wherein the type of each target device is one of a computer, computing device, audio player, video player or cellular telephone.

16. The method of claim 14, wherein the second instance has the same set of coefficients for its polynomials as the first instance, and each coefficient is associated with a different set of polynomials.

17. The method of claim 1, wherein the network is the Internet.

18. A non-transitory computer readable medium storing computer code for performing the method of claim 1.

19. A computer system or server programmed to perform the method of claim 1.

20. A method to use protected digital content at a device, comprising the acts of:
storing in a first data storage the protected digital content and a first authentication value for authentication of the content received over a computer network at the target device;

selecting at the target device one instance of a family of non-linear multivariate polynomials characterized by a set of parameters; and transforming the protected digital content by applying thereto the selected instance to arrive at a second authentication value which is stored in a second data storage to be matched to the first authentication value, wherein a number of data blocks in the authentication value is equal to a number of the instances in the family of polynomials.

21. Apparatus for protecting digital content, comprising:
a first storage element for storing the digital content;
a second storage element for storing a family of non-linear multivariate polynomials characterized by a set of parameters to be used for authentication of the content;
a selector coupled to the second storage element for selecting therefrom one instance of the family based on a current state of the apparatus;
a transforming element coupled to the first storage element and to an output of the second storage element, and which applies to the digital content the selected one instance of the family to calculate an authentication value, wherein a number of data blocks in the authentication value is equal to a number of instances in the family of polynomials; and
a third storage element coupled to an output of the transforming element for storing the authentication value.

22. Apparatus for using protected digital content received in a device, the apparatus comprising:
a first storage element for storing the protected content and a first authentication value for authentication of the content received in the device;
a partitioner coupled to the first storage element for partitioning the stored content into blocks;
a transforming element coupled to an output of the partitioner and which selects one instance of a family of non-linear multivariate polynomials characterized by a set of parameters, and then transforms each block by applying thereto the selected one instance to arrive at a second authentication value, wherein a number of data blocks in the authentication value is equal to a number of the instances in the family of polynomials; and
a second storage element coupled to an output of the transforming element for storing the second authentication value.

* * * * *